Sept. 8, 1964 J. G. ANDERSON 3,148,372
SURGE VOLTAGE RECORDER
Filed March 9, 1961 2 Sheets-Sheet 1
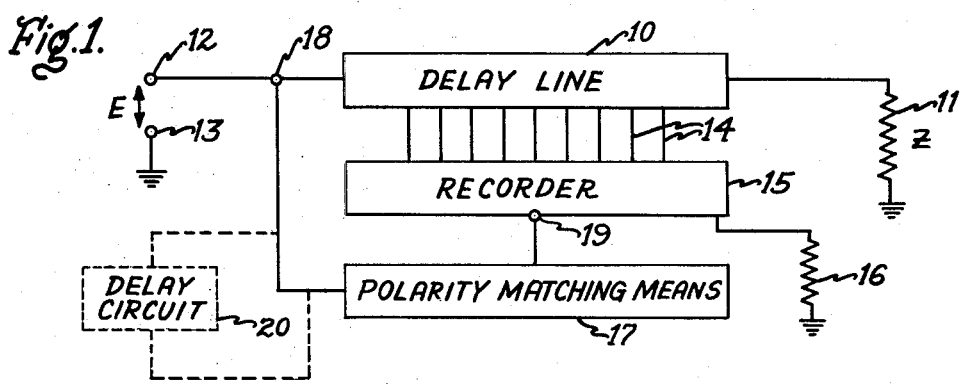
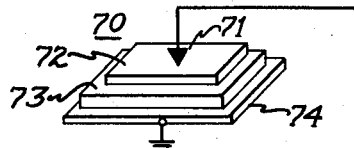
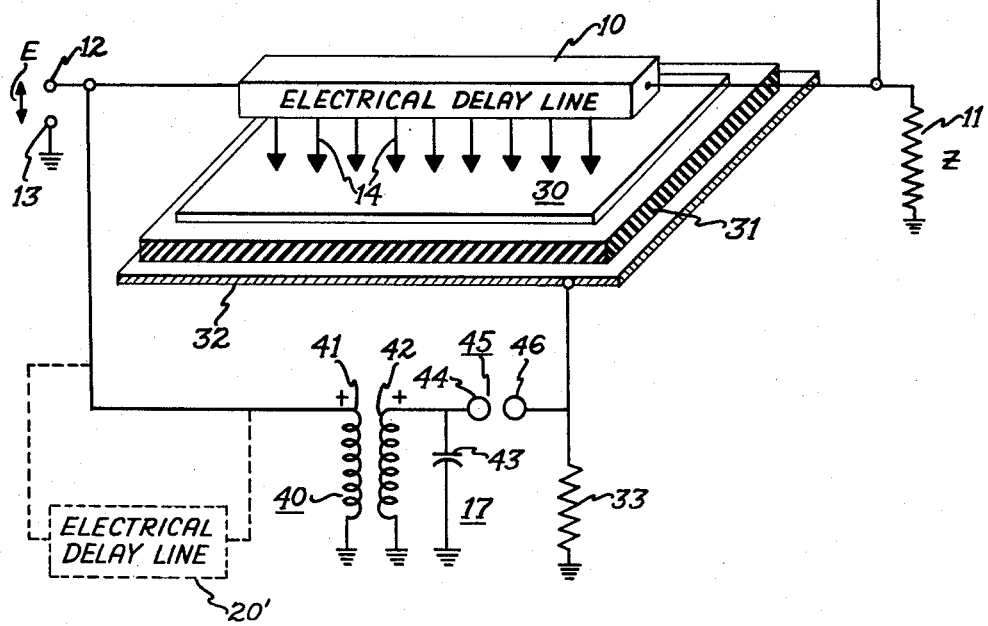
Inventor:
John G. Anderson,
by Gilbert P. Tarleton
His Attorney.

Sept. 8, 1964  J. G. ANDERSON  3,148,372
SURGE VOLTAGE RECORDER
Filed March 9, 1961  2 Sheets-Sheet 2
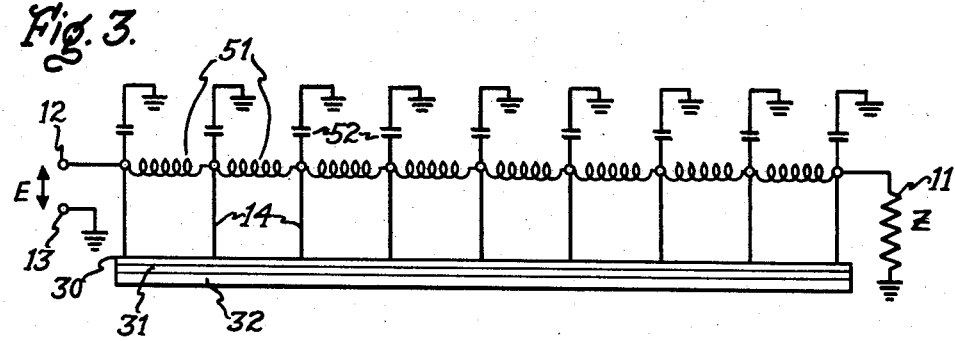
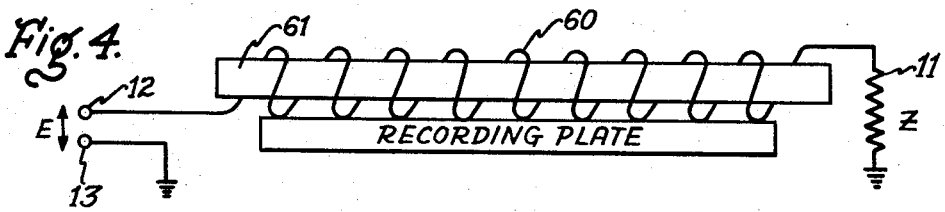
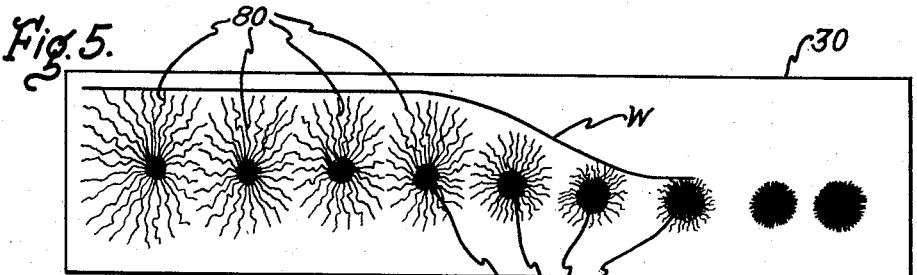
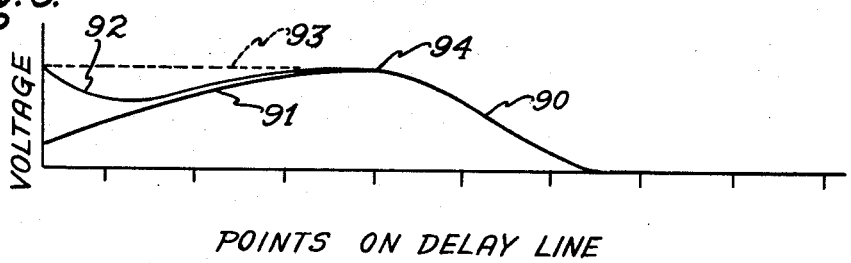
POINTS ON DELAY LINE
Inventor,
John G. Anderson,
by Gilbert P. Tarleton
His Attorney.

United States Patent Office 3,148,372
Patented Sept. 8, 1964

3,148,372
SURGE VOLTAGE RECORDER
John G. Anderson, Dalton, Mass., assignor to General Electric Company, a corporation of New York
Filed Mar. 9, 1961, Ser. No. 94,544
6 Claims. (Cl. 346—74)

This invention relates to the measurement of electrical quantities, and more in particular to an improved apparatus for recording the maximum crest and frontal wave shape of transient voltages.

For the purpose of designing electrical equipment it is desirable to know the various conditions to which the equipment will be subject while in service. Determination of a condition normally presents no great problem when its occurrence is frequent, but when occurrence of the condition is infrequent it is not easy to determine its exact nature. For example, it is desirable to provide means for obtaining field data on the maximum crest and rate of rise of random voltage and current surges to which an electrical apparatus, such as a power transformer, may be subject in service. The surges may arise for example from such causes as lightning or switching. Means for obtaining such data have been described and claimed in my co-pending patent application Serial No. 693,166, filed October 29, 1957, and assigned to the same assignee as this invention (now Patent 3,034,124, granted May 8, 1962).

This invention relates to a modification in surge voltage recording means of the type disclosed in the abovementioned application that possesses certain advantages in some situations. For example, in designing components for electrical power transmission sytems, it is not always necessary to determine the complete shape of transient surge voltage waves; it is often necessary to merely record the shape of the leading end of such waves and their maximum crest. Furthermore, when wave shape recording means is intended to be actuated by surge voltages above a predetermined critical value (e.g. 5 kv.) after a predetermined interval, surges much higher than the critical value may cause spurious Lichtenberg figures to be formed before the firing circuit goes off.

Accordingly, it is an object of this invention to provide surge voltage recording means that eliminates the difficulties mentioned above.

Another object of the invention is to provide surge voltage recording means that is simplified in structure and economical in cost.

A still further object of the invention is to provide surge voltage recording means that records the wave shape of the leading end of a voltage surge and also the maximum crest attained by the surge.

A further object of the invention is to provide surge voltage recording means which will not produce spurious Lichtenberg figures.

Another object of the invention is to provide surge voltage recording means that has no moving parts and requires no external power supply.

Briefly stated, in accordance with one aspect of my invention, means for recording a voltage surge may be provided with a delay line having electrodes adjacent means for recording voltage discharge patterns. The electrodes are continuously actuated to produce discharge patterns of the same polarity as a voltage surge travelling along the delay line, until after a predetermined interval when polarity matching means connected to the recording means causes the polarity on the recording means to match the polarity of the electrodes. This prevents further production of discharge patterns of the same polarity as the voltage surge.

Other objects and advantages of my invention will become apparent to those skilled in the art from the specification, drawing, and claims which follow, and the scope of the invention will be pointed out in the claims.

In the drawing:

FIGURE 1 is a block diagram of surge voltage recording means according to my invention.

FIGURE 2 is a circuit diagram showing an embodiment of surge voltage recording means of the type illustrated in FIG. 1.

FIGURE 3 is a circuit diagram of one embodiment of a portion of the surge voltage recorder of my invention showing one type of delay line.

FIGURE 4 is a circuit diagram of another embodiment of my invention showing another type of delay line.

FIGURE 5 is a schematic representation of one type of discharge pattern produced by my invention.

FIGURE 6 shows how two types of wave forms may be recorded by my invention.

The invention will now be described by reference to the drawing. In FIGURE 1 a delay line 10 is shown connected to ground at one end through a characteristic impedance 11, and connected to an input terminal 12 at its other end. The terminal 12 and an associated grounded terminal 13 are adapted to have the voltage to be recorded, E, applied thereacross. A plurality of linearly spaced points on the delay line 10 may be connected to a stationary recorder 15 by means of electrodes 14. The recorder 15 may be any number of known types, and is connected to ground through a resistance 16. Polarity matching means 17 for producing an impulse of the same polarity as the voltage wave E is connected at 18 to the input end of the delay line and at 19 to the recorder 15. In certain situations it may be necessary to employ a separate delay circuit 20 connected in series with the input end of the polarity matching means 17 to delay the polarity matching impulse until after wave E has travelled along the delay line for a predetermined time.

Referring now to FIGURE 2, the structure of a surge voltage recorder with a preferred polarity matching circuit will now be described. The delay line 10 is grounded through an impedance 11 and connected to an input terminal 12, adapted to have the surge voltage E applied thereacross in the manner previously described. The delay line 10 may be one of several different types to be described in paragraphs that follow. A plurality of linearly spaced point electrodes 14 are adjacent to or in contact with a recording medium 30. The recording medium 30 may be any of the well-known types that form a voltage discharge pattern as, for example, photographic film, dust, or silicone grease. The medium 30 may be applied to or supported by a plate 31 of dielectric material. The plate 31 is supported by a metallic plate electrode 32, which is connected to ground through a resistance 33. The electrode 32 is electrically connected to the input end of the delay line 10 through a polarity matching circuit 17.

The polarity matching circuit comprises pulse transformer 40 having a primary winding 41 and a secondary winding 42 arranged so that the output of the transformer has the same polarity as its input. A capacitance 43 is connected to ground across the secondary winding 42 of the impulse transformer. The winding 42 and capacitance 43 are connected to one member 44 of a discharge gap 45. The other member 46 forming the discharge gap 45 is connected between the plate electrode 32 and grounded resistance 33. When the retarding effect of the circuit 17 is insufficient, an electrical delay line 20' having less delay than the delay line 10 may be connected between the input of the transformer 40 and the input terminal 12.

The delay line 10 may take the form of any well known type, as for example, the "lumped constant" type illustrated in FIGURE 3. A "lumped constant" delay line may comprise a plurality of series inductances 51 and parallel capacitances 52. The values of the components of the delay line may, of course, be selected to provide any desirable delay, depending on the anticipated wave form to be recorded. The electrodes 14 are provided at a plurality of linearly spaced points on the delay line and are in contact with a recording medium 30 on a dielectric plate 31, which is supported by a metallic plate electrode 32 in the manner previously described.

The delay line, as illustrated in FIGURE 4, may also be of the distributive type, comprising a coil 60 of wire wound on an elongated insulating member 61. In this type of delay line, the turns of the coil 60 may be used as electrodes contacting the recording medium, thus facilitating the provision of a great number of voltage discharge points between the plate and the delay line. This results in a much finer resolution of the wave shape. It is to be understood, of course, that the specific form of the delay line forms no part of the present invention, since these circuit components are well known to the art.

Although numerous elements have been described and illustrated as being connected to ground, it is not intended that the ground points be at zero potential. Instead, in both the specification and claims, it is intended that the terms "ground" and "grounded" and the symbols therefor in the drawing designate a given reference potential that may or may not be literally ground potential.

The operation of my surge recording means will now be described with reference to FIG. 2. Assuming a surge voltage wave E has been applied to the input terminals 12 and 13 and has traveled approximately half-way down the delay line 10, the wave will have continuously formed Lichtenberg figures on the medium 30 between the point electrodes 14 it has passed and the plate electrode 32. The size of the Lichtenberg figures will correspond to the maximum crest of the wave that has passed each of the points 14. As the wave is traveling down the delay line 10 it is also energizing the pulse transformer 40, which increases the voltage on its output side. Assuming the voltage surge E is positive in polarity, the output of the transformer 40 will be positive, as indicated by the plus signs (+) in FIG. 2. As the wave travels along the delay line 10, the transformer 40 charges the capacitance 43. At a predetermined time after the initial application of the voltage surge, the trigger gap 45 flashes over. This suddenly produces a strong voltage of the same polarity as the traveling wave on the plate electrode 32. Depending on the turns ratio of the transformer 40, the potential difference between the point electrodes 14 and the plate electrode 32 is reduced either to zero or made opposite in polarity to that existing prior to the time of firing. The capacitor 43 will discharge through the resistance 33 and thus cause the spark to continue across the gap 45. This will cause the zero or opposite polarity between the point electrodes 14 and plate electrode 32 to continue for the remaining duration of the wave as it completes its travel down the delay line 10 to ground. The time it takes to completely discharge the capacitance 43 will be determined by the constants of the transformer 40, the size of the gap 45, the value of the resistance 33, and the value of the capacitance 43. As will be apparent to those skilled in the art, these variables can be properly chosen to ensure that the plate 32 remains of the same polarity as the points 14 for the entire remaining duration of the voltage surge.

The delay in firing of the gap 45 caused by the energizing of the transformer 40 and changing of the capacitance 43 may result in sufficient delay in the firing of the gap 45 to produce the desired result. However, if additional delay is desired, a delay circuit, such as the delay line 20' which has less delay than the delay line 10, may be employed. When the surge E is a lightning stroke hitting a power transmission system, the surge may, for example, travel through the delay line 10 in about 5 to 6 microseconds. In such a case, the polarity reversing circuit 17 should be designed to fire in about 3 to 4 microseconds.

The Lichtenberg figures produced before the firing of gap 45 are of the same polarity as the surge E. After the firing of the gap 45, Lichtenberg figures either cannot form because the potential difference between the electrodes 14 and plate 32 is too low, or if discharges occur, the figures are of the opposite polarity to those produced prior to the time of firing. As is well known in the art, marked differences exist between positive and negative Lichtenberg figures. This makes it easy to distinguish such figures, even when they are superimposed. This enables identification of the figures that indicate the wave shape of the surge.

In order to ensure that the polarity of the incoming wave is known, polarity detecting means 70 may be applied to the delay line 10. The means 70 may comprise a point electrode 71 in contact with a discharge image recording medium 72. The medium 72 may be photographic film supported by a plate of dielectric material 73 in contact with a grounded plate electrode 74, all according to conventional practice.

FIGURE 5 illustrates one type of discharge pattern formed on a recording medium 30, such as photographic film, by a positive voltage wave having the shape W. Since the wave W is positive in polarity, it produced a series of positive Lichtenberg figures 80 as it traveled down the delay line 10, with the length of the streamers in the Lichtenberg figures being proportional to the maximum amplitude of the wave that passed the point electrode 14 on the delay line where each streamer was produced. When the spark gap 45 fires, a potential difference may be produced between the plate electrode 32 and the point electrodes 14 that has sufficient magnitude to cause exposure of the medium 30. Since the firing of the gap 45 reverses the polarity of the plate 32 with respect to the point electrodes 14, a series of negative Lichtenberg figures 81 would be superimposed upon the positive figures 80. The negative figures 81 are easily distinguished from the positive figures 80, so the shape of the wave defined by the outer end of the streamers in the positive Lichtenberg figures can be easily determined. If after the gap 45 fires the potential difference between the electrodes 14 and plate 32 is not sufficient to produce a figure on the medium 30, only the positive figures 80 will be produced. This makes determination of wave shape even easier.

This eliminates a difficulty that existed with certain previous arrangements that first fired at a predetermined time after the surge entered a delay line. In such arrangements spurious Lichtenberg figures of the same polarity as those produced by the proper firing of the recording device were sometimes formed when the incoming wave had a very high amplitude. The superpositioning of spurious Lichtenberg figures of the same polarity on those produced by proper firing the voltage recorder resulted in a record that was extremely difficult to accurately interpret. This difficulty has been eliminated because the polarity matching means 17 prevents formation of spurious figures having the same polarity as the surge.

The continuous firing of the point electrodes 14 as the wave travels along the delay line 10 produces Lichtenberg figures corresponding to the maximum amplitude of the wave that has passed each point electrode, regardless of the subsequent ampliutde of the wave or the previous amplitude of the wave. This means that if the wave is oscillatory, or if the amplitude of the wave decreases at its terminal end, the latter portions of the wave will not be accurately recorded. This can be better explained by reference to FIG. 6. If a voltage wave having a frontal shape designated 90 passes along the delay line and its trailing shape is either 91, 92, or a similar shape, the image produced by the Lichtenbergs will define a trailing wave shape 93 corresponding to the maximum amplitude 94 of the wave. When it is necessary to record the shape of the entire wave, the recording means described in this application is unsatisfactory. However, in many situations it is merely necessary to determine the shape of the leading end of the wave and the maximum amplitude attained by the wave. This is readily accomplished by my invention, as is apparent from the preceding description.

It will be understood, of course, that while the forms of the invention herein shown and described constitute preferred embodiments of the invention, it is not intended herein to illustrate all of the equivalent forms or remifications thereof. It will also be understood that the words used are words of description rather than of limitation, and that various changes may be made without departing from the spirit or scope of the invention herein disclosed. It is aimed in the appended claims to cover all such changes as fall within the true spirit and scope of the invention.

What I claim as new and desired to secure by Letters Patent of the United States is:

1. Means for recording the shape of a voltage wave comprising, an electrical delay line adapted to have voltage waves applied thereto, a plurality of electrodes on said delay line, a plate electrode spaced opposite the first mentioned electrodes, a medium between plate electrode and first mentioned electrodes for recording patterns of electrical discharges occurring therebetween, the first mentioned electrodes that have been charged by a voltage wave traveling along the delay line producing continuously discharge patterns of the same polarity as the wave until a predetermined time interval after the wave enters the delay line, and means for causing the polarity of said plate electrode to match that of said first mentioned electrodes after said predetermined time interval.

2. Means for recording the maximum crest and leading end shape of a voltage wave comprising, an electrical delay line adapted to have voltage waves applied thereto, a plurality of linearly spaced point electrodes on said delay line, a grounded plate electrode spaced opposite said point electrodes, a medium between said plate electrode and point electrodes for recording patterns of electrical discharges occurring therebetween, the point electrodes that have been charged by a voltage wave traveling along the delay line producing continuously discharge patterns of the same polarity as the wave until a predetermined time interval after the wave enters the delay line, and means for causing the polarity of said plate electrode to match that of said point electrodes after predetermined time interval, whereby further production of discharge patterns of the same polarity as said wave is prevented.

3. Means for recording the maximum crest and leading end shape of a voltage wave comprising, an electrical delay line adapted to have voltage waves applied thereto, a plurality of linearly spaced point electrodes on said delay line, a plate electrode spaced opposite said point electrodes, said plate electrode being connected to ground through a resistance, a medium between said plate electrode and point electrodes for recording patterns of electrical discharges occurring therebetween, the point electrodes that have been charged by a voltage wave traveling along the delay line producing continuously discharge patterns of the same polarity as the wave until a predetermined time interval after the wave enters the delay line, means for causing the polarity of said plate electrode to match that of said point electrodes comprising a spark gap connected between the input end of said delay line and said resistance, grounded capacitance means connected between said spark gap and the input end of said delay line, and means delaying spraking of said gap until after said predetermined time interval, whereby further production of discharge patterns of the same polarity as said wave is prevented.

4. Means for recording the maximum crest and leading end shape of a voltage wave comprising, an electrical delay line adapted to have voltage waves applied thereto, a plurality of linearly spaced point electrodes on said delay line, a plate electrode spaced opposite said point electrodes, said plate electrode being grounded through a resistance, a medium between said plate electrode and point electrodes for recording patterns of electrical discharge occurring therebetween, the point electrodes that have been charged by a voltage wave traveling along the delay line producing continuously discharge patterns of the same polarity as the wave until a predetermined time interval after the wave enters the delay line, and a circuit for causing the polarity of said plate electrode to match that of said point electrodes comprising a step-up pulse transformer having its primary winding connected between the input end of said delay line and ground, the secondary winding of said transformer being connected between ground and one side of a spark gap, grounded capacitance means connected between the secondary winding and said one side of the spark gap, the other side of said spark gap being connected between said plate electrode and its associated resistance, and said secondary winding producing a voltage pulse of the same polarity as said wave, whereby further production of discharge patterns of the same polarity as said wave is prevented.

5. Means for recording the maximum crest and leading end shape of a voltage wave comprising, an electrical delay line adapted to have voltage waves applied thereto, a plurality of linearly spaced point electrodes on said delay line, a grounded plate electrode spaced opposite said point electrodes, said plate electrode being grounded through a resistance, a medium between said plate electrode and point electrodes for recording patterns of electrical discharges occurring therebetween, the point electrodes that have been charged by a voltage wave traveling along the delay line producing continuously discharge patterns of the same polarity as the wave until a predetermined time interval after the wave enters the delay line, and a circuit for causing the polarity of said plate electrode to match that of said point electrodes, comprising a step-up pulse transformer having its primary winding connected between the input end of said delay line and ground, the secondary winding of said transformer being connected between ground and one side of a spark gap, grounded capacitance means connected between the secondary winding and said one side of the spark gap, the other side of said spark gap being connected between said plate electrode and its associated resistance, said secondary winding producing a voltage pulse of the same polarity as said wave, and delay means connected between said primary winding and the input end of said delay line, whereby further production of discharge patterns of the same polarity as said wave is prevented, and means connected to said delay line for indicating the polarity of said wave.

6. Means for recording the maximum crest and leading end shape of a voltage wave comprising, a grounded electrical delay line adapted to have voltage waves applied thereto, said delay line being terminated by a characteristic impedance, a plurality of linearly spaced point electrodes on said delay line, a grounded plate electrode spaced opposite said point electrodes, said plate electrode being grounded through a resistance, a plate of dielectric material between said plate electrode and point electrodes, a medium on said dielectric plate for recording patterns of electrical discharges occurring between said plate and point electrodes, the point electrodes that have been charged by a voltage wave traveling along the delay line producing continuously discharge patterns of the same polarity as the wave until a predetermined time interval after the wave enters the delay line, and a circuit for causing the polarity of said plate electrode to match that of said point electrodes comprising a step-up pulse transformer having its primary winding connected between the input end of said delay line and ground, a delay line having less delay than the first mentioned delay line connected between said primary winding and the input end of the first mentioned delay line, the secondary winding of said transformer being connected between ground and one side of a spark gap, grounded capacitance means connected between the secondary winding and said one side of the spark gap, the other side of said spark gap being connected between said plate electrode and its associated resistance, said secondary winding producing a voltage pulse of the same polarity as said wave, whereby further production of discharge patterns of the same polarity as said wave is prevented, and means connected to said delay line for indicating the polarity of said wave.

References Cited in the file of this patent
UNITED STATES PATENTS

| | | |
|---|---|---|
| 2,739,865 | Willey | Mar. 27, 1956 |
| 2,953,746 | Benewicz | Sept. 20, 1960 |
| 3,034,124 | Anderson | May 9, 1962 |